United States Patent
Na (10) Patent No.: US 7,440,295 B2
(45) Date of Patent: Oct. 21, 2008

(54) SWITCHING MODE POWER SUPPLY WITH ACTIVE LOAD DETECTION FUNCTION, AND SWITCHING METHOD THEREOF

(75) Inventor: Tae-Kwon Na, Seoul (KR)

(73) Assignee: Samsung Electronics Co., Ltd, Suwon-Si (KR)

( * ) Notice: Subject to any disclaimer, the term of this patent is extended or adjusted under 35 U.S.C. 154(b) by 0 days.

(21) Appl. No.: 11/431,034

(22) Filed: May 10, 2006

(65) Prior Publication Data

US 2006/0285369 A1    Dec. 21, 2006

(30) Foreign Application Priority Data

Jun. 16, 2005    (KR)    .................... 10-2005-0052037

(51) Int. Cl.
H02M 3/335    (2006.01)
H02M 3/22    (2006.01)

(52) U.S. Cl. .................................. 363/21.07; 363/21.09
(58) Field of Classification Search ............. 363/21.07, 363/21.09, 21.15, 21.17, 97, 16, 18, 19, 15
See application file for complete search history.

(56) References Cited

U.S. PATENT DOCUMENTS 5,475,579 A * 12/1995 John et al. ............... 363/21.07
5,914,865 A * 6/1999 Barbehenn et al. ........ 363/21.15
7,064,966 B2 * 6/2006 Yamada et al. ............ 363/21.16

FOREIGN PATENT DOCUMENTS

| JP | 6-153382 | 5/1994 |
|---|---|---|
| JP | 8-266042 | 10/1996 |
| KR | 20-1998-029144 | 8/1998 |
| KR | P1999-0052422 | 7/1999 |

* cited by examiner

*Primary Examiner*—Gary L Laxton
(74) *Attorney, Agent, or Firm*—Roylance, Abrams, Berdo & Goodman, LLP (57) ABSTRACT

A switching mode power supply (SMPS) with an active load detection function which supplies AC power input to a primary coil of a transforming element, then to a secondary coil of the transforming element, and then rectifies and outputs the AC power is provided. The SMPS comprises a controlling unit for controlling switching frequency by changing the time constant of a switching unit depending on the current and reducing the amount of power supplied to the primary coil of the transforming element. The current at a terminal of a resistor can be controlled under a cross condition, and the current flowing to the resistor can be controlled when in a normal state, thereby preventing energy loss which always occur in the resistor. The switching frequency during a standby state can be reduced to reduce switching loss.

13 Claims, 5 Drawing Sheets

SWITCHING MODE POWER SUPPLY WITH ACTIVE LOAD DETECTION FUNCTION, AND SWITCHING METHOD THEREOF

BACKGROUND OF THE INVENTION

This application claims the benefit under 35 U.S.C. § 119 (e) of Korean Patent Application No. 10-2005-0052037, filed Jun. 16, 2005 in the Korean Intellectual Property Office, the entire disclosure of which is hereby incorporated by reference.

1. Field of the Invention

The present invention relates to a power supply. More particularly, the present invention relates to a switching mode power supply for use in electronic and electric devices such as a printer.

2. Description of the Related Art

Figure 1:
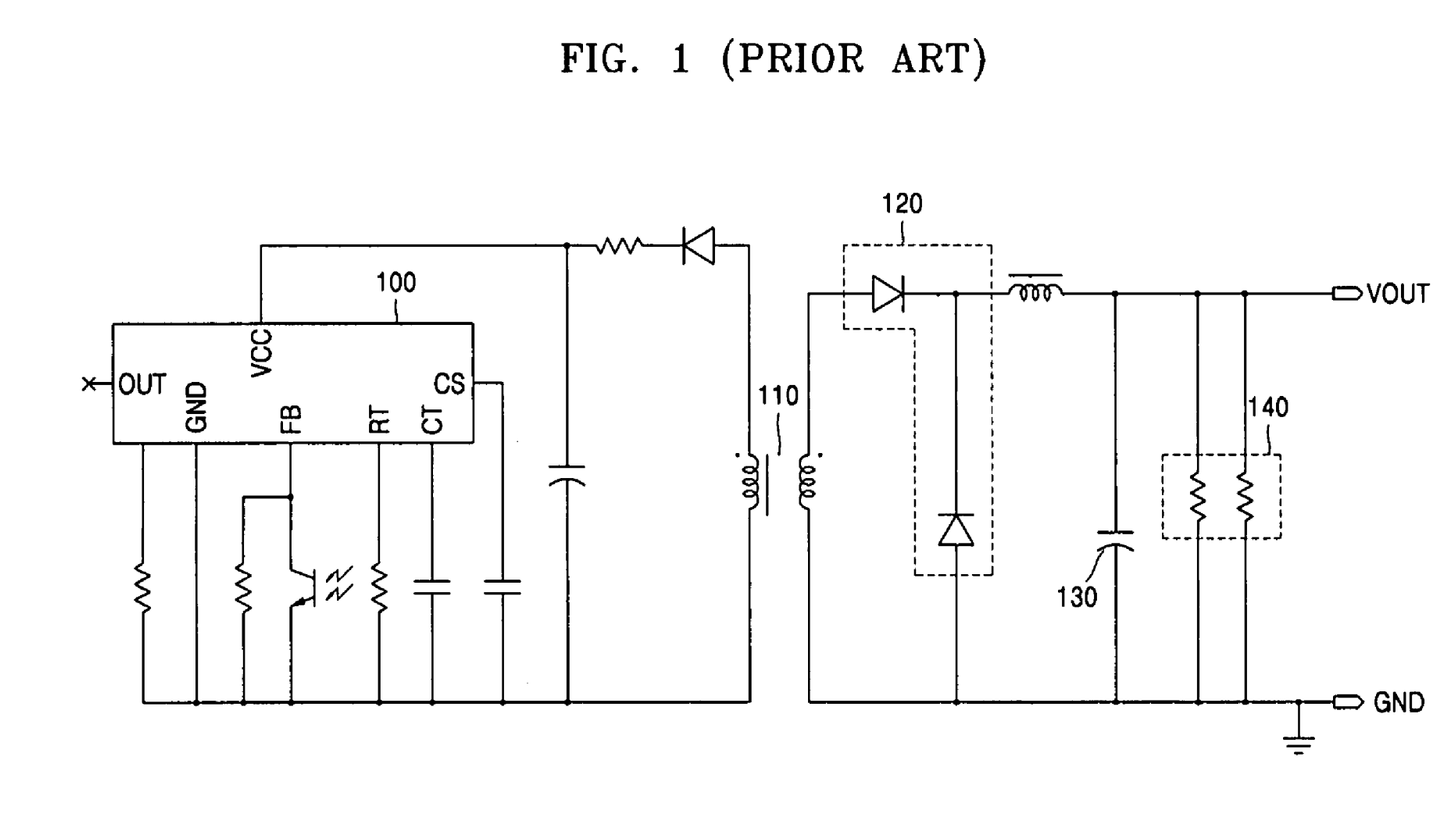
FIG. 1 is a circuit diagram of a portion of a conventional switching mode power supply (SMPS)

Improving power efficiency in power circuits is essential in overcoming environmental and energy problems which are getting more and more serious. FIG. 1 is a circuit diagram of a portion of a conventional switching mode power supply (SMPS).

The SMPS includes a pulse-width modulation (PWM) controller 100, a capacitor CT, a resistor RT, a transformer 110, an output diode 120, a planarizing capacitor 130, and a dummy resistor 140.

AC power supplied to an input terminal of the SMPS is converted into DC power via a filter, a bridge diode rectifier, and a capacitor. The converted DC power is switched via the PWM controller 100 of a terminal of a switching controller and a Metal Oxide Semiconductor Field-Effect Transistor (MOSFET). The converted DC power is supplied to a secondary coil of the transformer 110 via the transformer 110. The power output by the transformer 110 and supplied to the secondary coil is planarized by the output diode 120 and the planarizing capacitor 130 and output to where the power is demanded.

Although not illustrated in FIG. 1, the output power in FIG. 1 is fed back (FB) to a feedback controller. Using a programmable shunt regulator and a voltage dividing resistor, the feedback controller supplies current to a terminal of the programmable shunt regulator if the output voltage is greater than a reference value, thereby causing light to be emitted from a light emitting diode (LED) of a photocoupler. Alternatively, current is not supplied to the terminal of the programmable shunt regulator, thereby stopping or not causing emission of light from the LED of the photocoupler.

The PWM controller 100 controls switching operation of the SMPS so that the output voltage matches the reference voltage by sensing the reference voltage as described above. However, a conventional SMPS cannot detect a load connected the output terminal VOUT, and thus the PWM controller 100 always performs switching operations at the same frequency regardless of the load. As a result, inefficiency due to switching losses occur. In addition, because current flows through the output dummy resistor 140 regardless of whether a load is connected, power loss always occurs. Furthermore, power loss through resistor 140 generates heat in the SMPS, which in turn causes additional inefficiencies to occur in the SMPS.

SUMMARY OF THE INVENTION

The present invention provides a switching mode power supply (SMPS) with an active load detection function which can minimize energy consumption by fundamentally reducing the current flowing through a dummy resistor when there is no load at an output terminal, and a switching method of the SMPS.

According to an aspect of the present invention, a switching mode power supply is provided with an active load detection function for supplying AC power input to a primary coil of a transforming element, then to a secondary coil of the transforming element, and then rectifying and outputting the power. The switching mode power supply (SMPS) comprises a switching unit which switches the AC power input to the primary coil of the transforming element at a frequency determined by a predetermined time constant and supplying the switched AC power to the secondary coil of the transforming element. The SMPS further comprises a branching unit which branches current output from the secondary coil and supplies the branched current to a dummy resistor when the rectified current or voltage output from the secondary coil is greater or smaller than a predetermined value. The SMPS additionally comprises a detecting unit which detects the branched current flowing to the dummy resistor, and a controlling unit which controls switching frequency by changing the time constant of the switching unit depending on the detected branched current of the detecting unit and reducing the amount of power supplied to the primary coil of the transforming element.

According to another aspect of the present invention, there is provided a switching mode power supply with an active load detection function for supplying AC power input to a primary coil of a transforming element, then to a secondary coil of the transforming element, and then rectifying and outputting the power. The switching mode power supply (SMPS) comprises a switching unit which switches the AC power input to the primary coil of the transforming element at a frequency determined by a predetermined time constant and supplying the switched AC power to the secondary coil of the transforming element. The SMPS further comprises a branching unit which branches current output from the secondary coil and supplies the branched current to a dummy resistor when the rectified voltage output from the secondary coil is greater than a predetermined value. The SMPS additionally comprises a detecting unit which detects the branched current flowing to the dummy resistor, and a controlling unit which reduces switching frequency by changing the time constant of the switching unit depending on the detected branched current of the detecting unit and reducing the amount of power supplied to the primary coil of the transforming element.

The branching unit may stop branching the current flowing to the dummy resistor when the rectified voltage output from the secondary coil is less than a reference value. If the detecting unit cannot detect the current flowing to the dummy resistor, the controlling unit may control the switching unit to operate at a frequency according to the predetermined time constant.

According to another aspect of the present invention, there is provided a method of switching a switching mode power supply for supplying AC power to a transforming element after switching the power according to a frequency determined by a predetermined time constant, and rectifying and outputting power from a secondary coil of the transforming element. The switching method comprises comparing the rectified output voltage with a reference value, branching the rectified output current when the rectified output voltage is greater than the reference value, and detecting the branched current flowing to a dummy resistor. The method further comprises changing the predetermined time constant to reduce the switching frequency so that the AC power supplied to the transforming element is reduced.

The switching method may further comprise, after branching the rectified output current, blocking the branched current supplied to the dummy resistor and maintaining the time constant used to determined the switching frequency as the predetermined time constant if the rectified output voltage after branching and supplying the current to the dummy resistor is less than the reference value.

BRIEF DESCRIPTION OF THE DRAWINGS

The above and other exemplary features and advantages of the present invention will become more apparent by describing in detail certain exemplary embodiments thereof with reference to the accompanying drawings, in which.

Throughout the drawings, like reference numbers should be understood to refer to like elements, features, and structures.

DETAILED DESCRIPTION OF EXEMPLARY EMBODIMENTS

The matters exemplified in this description are provided to assist in a comprehensive understanding of various exemplary embodiments of the present invention disclosed with reference to the accompanying figures. Accordingly, those of ordinary skill in the art will recognize that various changes and modifications of the exemplary embodiments described herein can be made without departing from the scope and spirit of the claimed invention. Descriptions of well-known functions and constructions are omitted for clarity and conciseness.

Figure 2:
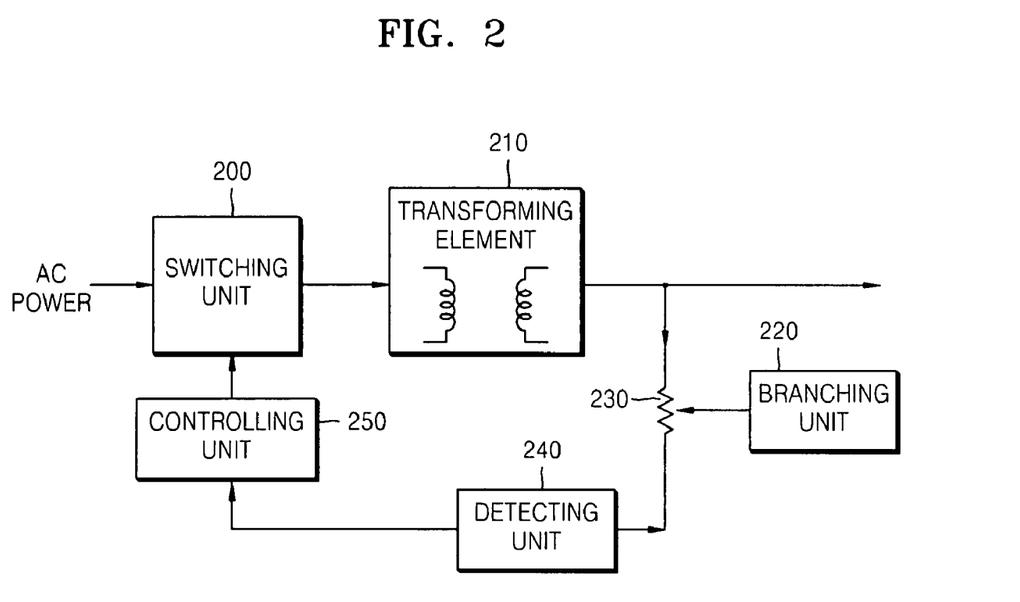
FIG. 2 is a block diagram of a portion of an SMPS with an active mode detection function according to an exemplary embodiment of the present invention.

FIG. 2 is a block diagram of a portion of a switching mode power supply (SMPS) with an active mode detection function according to an exemplary embodiment of the present invention.

The SMPS, according to an exemplary embodiment, in which AC power is input to a primary coil of transforming element 210, supplied to a secondary coil of transforming element 210, then rectified and output, may comprise the following components. A switching unit 200 switches the AC power input to the primary coil of transforming element 210 at a frequency determined by a predetermined time constant and supplies AC power to a secondary coil of transforming element 210. A branching unit 220 branches the rectified current output from the secondary coil and supplies the branched current to a dummy resistor 230 if the rectified current or voltage output from the secondary coil is lower or higher than a predetermined value. A detecting unit 240 detects the flow of branched current to the dummy resistor 230. A controlling unit 250 decreases the current transmitted to the primary coil of the transforming element 210 by controlling the switching speed by changing the time constant of the switching unit 200 depending on the detection results of the detecting unit 240. In FIG. 2, components of the SMPS related to rectifying and planarizing a signal output from the transforming element 210 are not shown.

One of the problems in a conventional SMPS illustrated in FIG. 1 is that current continually flows through dummy resistor 140 regardless of whether there is a load at the output terminal VOUT. The dummy resistor 230 in FIG. 2 is related to the dummy resistor 140 illustrated in FIG. 1.

Another problem with a conventional SMPS is that cross regulation occurs during maximum load of another output terminal or a minimum load of a corresponding output terminal (this is known as the cross condition), thereby increasing the voltage of the corresponding output terminal. That is, the corresponding output terminal is an output terminal of transformer 110 at which there is a minimum load or hardly any load. In this case, a dummy resistor must be included so that the corresponding terminal generates the minimum load.

The branching unit 220 detects the increasing voltage or the decreasing current at the corresponding output terminal under the cross condition, branches the current output from the secondary coil of the transforming element 210 if the detected voltage is greater than a reference value or the detected current is less than a reference value, and supplies the branched current to the dummy resistor 230.

The branching unit 220 includes a diode connected to the dummy resistor 230. When the rectified current changes after being output from the secondary coil of the transforming element 210, the branching unit 220 may branch the rectified current according to the change in voltage via the diode and supply the branched current to the dummy resistor 230. In other words, while current is always supplied to the dummy resistor 140 regardless of whether there is a load present in the conventional SMPS, the current is branched only under a specific condition described above and passes through the dummy resistor 230 only when there is no load in the SMPS of the present invention.

The detecting unit 240 senses the current supplied to the dummy resistor 230 and notifies this to the controlling unit 250. The detecting unit 240 notifies the controlling unit 250 of the current flowing through the dummy resistor 230, signifying that there is no load at the output terminal of the SMPS.

From the SMPS's point of view, there is no load at its output terminal and if the power supplied to the transforming element 210 as well as the dummy resistor 230 is reduced, energy can be saved. To achieve this, the controlling unit 250 changes the time constant of the switching unit 200 and controls the operating frequency of the switching unit 200 if the detecting unit 240 detects the current flowing to the dummy resistor 230. As a result, the switching frequency of the switching unit 200 is changed and the power supplied to the primary coil of the transforming element 210 is reduced. Thus, the output of the SMPS can be controlled when there is no load at the output terminal of the SMPS.

Details of exemplary configurations of the present invention using a voltage increasing condition under the cross condition will be described.

In FIG. 2, functions of the branching unit 220 are limited to dividing the current output from the secondary coil and supplying the branched current to the dummy resistor 230 if the rectified voltage output from the secondary coil is greater than a reference value. Functions of the controller 250 are limited to changing the time constant of the switching unit 200 according to the detection result of the detecting unit 240 and reducing the switching frequency, thereby reducing the power supplied to the primary coil of the transforming element 210.

The branching unit 220 stops branching the current supplied to the dummy resistor 230 and blocks the current from flowing to the dummy resistor 230 if the rectified voltage output from the secondary coil is less than a reference value. If the detecting unit 240 does not detect the current flowing to the dummy resistor 230, the controlling unit 250 controls the switching unit 200 to operate at a frequency of a predetermined time constant, that is, an initial time constant.

The branching unit 220 may comprise a diode device connected to the dummy resistor 230 and may branch the rectified current output to the dummy resistor 230 via the diode device if the rectified voltage is greater than a reference value.

The detecting unit 240 may comprise a photocoupler light emitting unit connected to the dummy resistor 230. The detecting unit 240 can detect the current flowing through the dummy resistor 230 by detecting light emitted from the photocoupler light emitting unit as the branched current supplied to the dummy resistor 230 passes through the photocoupler light emitting unit. The controlling unit 250 can comprise a photocoupler light receiving unit and a control capacitor connected to the photocoupler light receiving unit. The photocoupler light receiving unit detects the light emitted from the photocoupler light emitting unit included in the detecting unit 240 and supplies the current. Then, the time constant of the switching unit 200 is changed depending on the capacity of the control capacitor as the supplied current passes through the control capacitor. Thus, the switching frequency is changed according to the changed frequency determined by the changed time constant.

Figure 3:
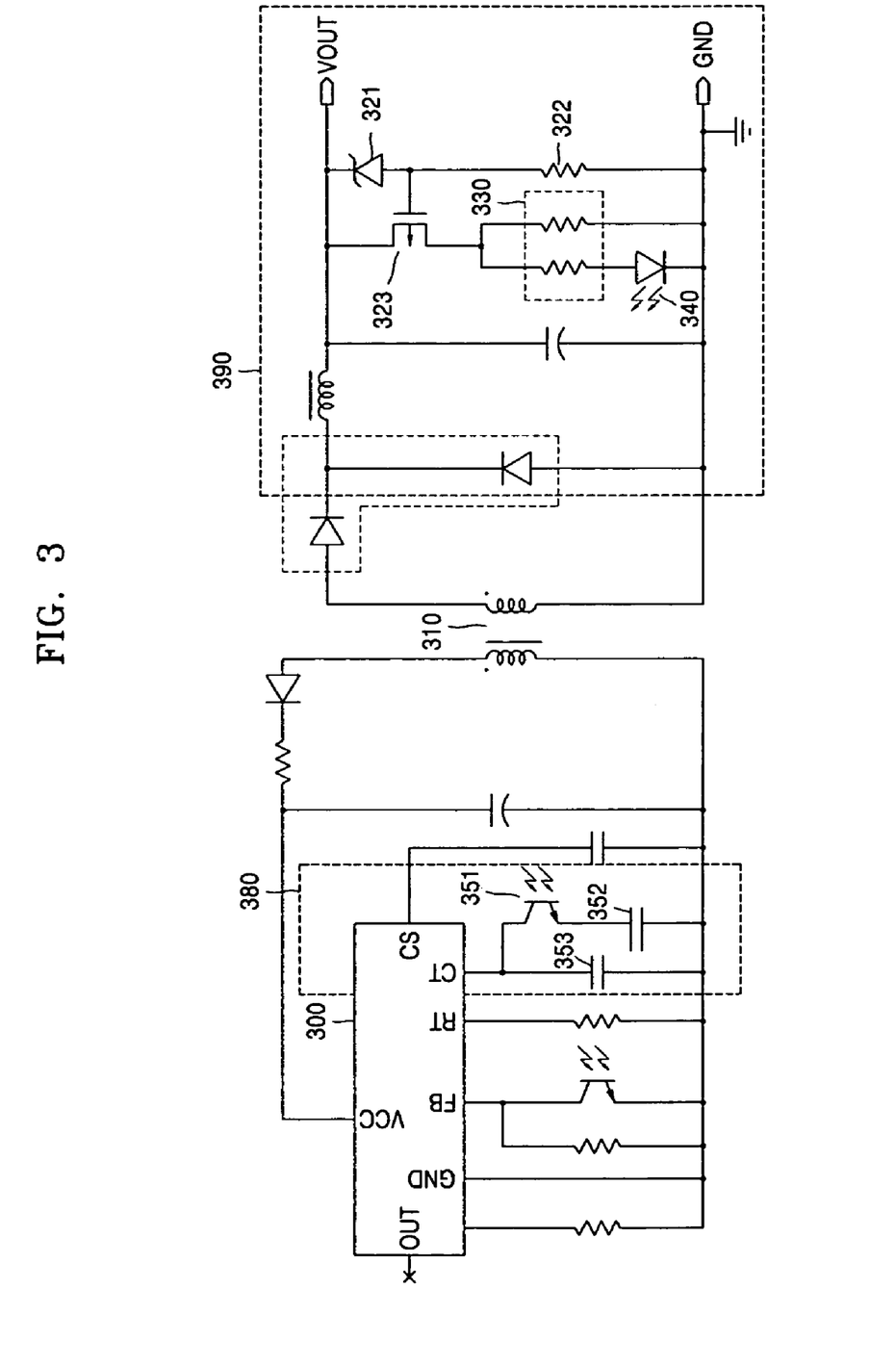
FIG. 3 is a circuit diagram of a portion of an SMPS with an active mode detection function according to an exemplary embodiment of the present invention.

FIG. 3 is a circuit diagram of a portion of an SMPS with an active mode detection function according to an exemplary embodiment of the present invention. The SMPS with the active mode detection function comprises all the components described in the previous exemplary embodiment. Compared to the conventional SMPS illustrated in FIG. 1, the SMPS in FIG. 3 comprises a unit 380 in close proximity to the primary coil of a transforming element 310 and a unit 390 in close proximity to the secondary coil of the transforming element 310.

The operation of the circuit diagram illustrated in FIG. 3 will be described below.

A switching unit 300 illustrated in FIG. 3 is a commonly used device in a conventional SMPS. The time constant of the switching unit 300 is determined only by a single capacitor 353 in the conventional art, but in exemplary embodiment of the present invention, the unit 380 is used to actively change the time constant depending on whether a load is present at an output terminal of the SMPS.

When there is a load at the output terminal VOUT of the SMPS, in other words, when the SMPS is not in a cross condition, current does not flow to a dummy resistor 330 due to devices such as a diode, especially a zener diode 321, and MOSFET 323 block current. Thus, the SMPS in FIG. 3 is different from the conventional SMPS illustrated in FIG. 1 in which a small amount of current is supplied to a dummy resistor 140 even when there is a load at the output terminal VOUT of the SMPS.

When there is no load at the output terminal VOUT in FIG. 3, voltage increases due to the cross condition described above, and current passes through the zener diode 321. If the current passing through the zener diode 321 exceeds a predetermined value, the MOSFET 323 supplies current to the dummy resistor 330. If the characteristics of the zener diode 321 are altered, the current may pass through the zener diode 321 if the output voltage VOUT is greater than the predetermined value.

When the current flows through the dummy resistor 330, a certain load is maintained according to the resistance of the dummy resistor 330, thereby preventing increased voltage caused by the cross condition. In this case, the zener diode 321 and the MOSFET 323 are included in the branching unit 220, and a resistor 322 prevents a short from occurring between ground (GND) and a signal line (VOUT).

When the current flows through the dummy resistor 330, light is emitted from a photocoupler light emitting unit 340 to indicate that current is flowing through the dummy resistor 330. The emitted light is sensed by a photocoupler light receiving unit (not shown) that is included in photocoupler 351. The photocoupler light receiving unit applies an electric current to the photocoupler 351.

The primary coil and the secondary coil of the transforming element 310 should be electrically separated. Thus, a light emitting and receiving device such as the photocoupler emitting unit 340 and a receiving unit in the photocoupler 351 may be used to send and receive the results detected at the primary coil and the secondary coil.

In the conventional SMPS, the time constant which determines the switching frequency of a switching unit 300 is determined by the capacitor 353. However, in the exemplary embodiment of the present invention, the time constant is determined by a capacitance determined by a control capacitor 352. The control capacitor and capacitor 353 are connected in parallel. According to a frequency corresponding to the determined time constant, power is switched by the switching unit 300 and supplied to the transforming element 310.

The overall capacitance is increased according to the parallel-connected capacitors 352 and 353 and the switching frequency is accordingly decreased because of the increased capacitance. As a result, the power supplied to the transforming element 310 is reduced. In other words, energy consumption is lowered by reducing the power supplied to the transforming element 310 when there is no load at the output terminal VOUT.

If a system connected to the output terminal VOUT requires power, that is, if there is a load, the cross condition is removed. Thus, the voltage is lowered, the current does not flow through the zener diode 321 of the branching unit 220 (see FIG. 2), the MOSFET 323 is switched on, and consequently the current does not flow to the dummy resistor 330. Light is therefore not emitted from the photocoupler unit 340 and the photocoupler light receiving unit in the photocoupler 351 does not receive any light. As a result, the control capacitor 352 is opened and the power is switched to the transforming element 310 by the switching unit 300 at the initial frequency determined by the time constant according to capacitor 353.

As described above, the SMPS of the exemplary embodiment of the present invention completely blocks current flowing to the dummy resistor 330 when there is a load, and allows current to flow to the dummy resistor 330 only when there is no load. Thus, the SMPS reduces energy consumption due to switching loss by minimizing the amount of power supplied to the transforming element 310.

As to FIG. 2, the photocoupler light emitting unit 340 is included in the detecting unit 240, and the photocoupler light receiving unit 351 and the control capacitor 352 are included in the controlling unit 250.

Figure 4:
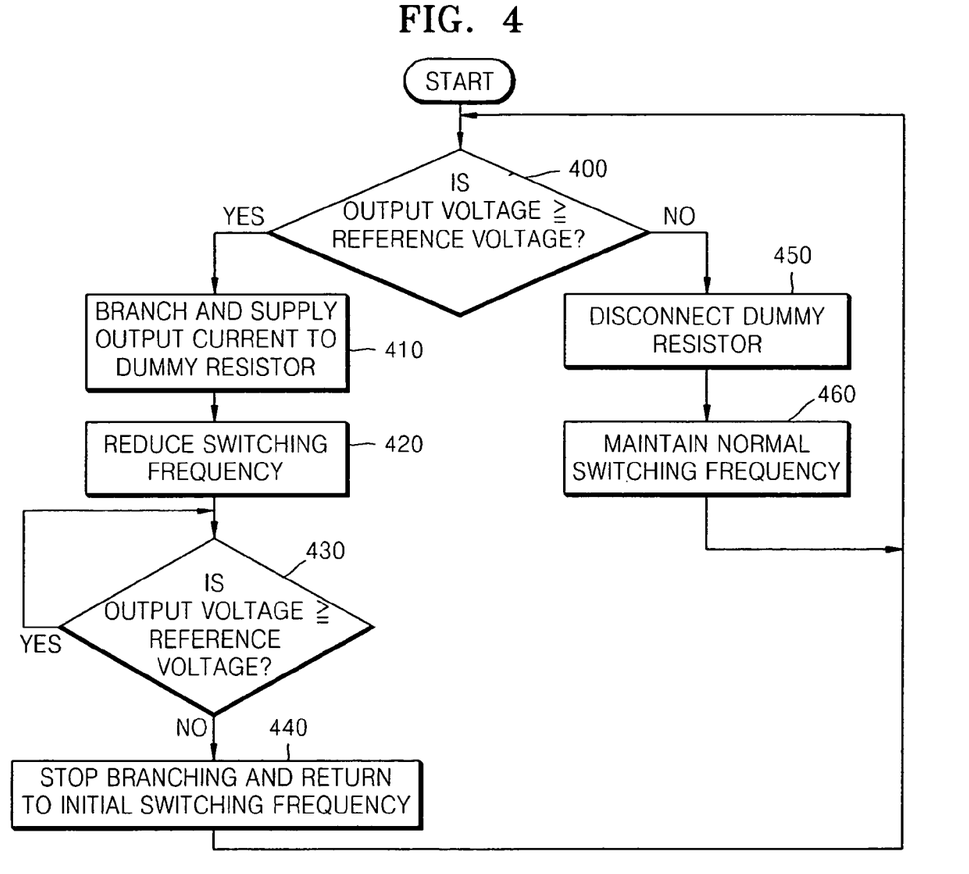
FIG. 4 is a flow chart illustrating a switching method of an SMPS with the active mode detection function according to an exemplary embodiment of the present invention.

FIG. 4 is a flow chart illustrating a switching method of an SMPS with the active mode detection function according to an exemplary embodiment of the present invention.

The switching method of the SMPS in which AC power is supplied to the transforming element 310 after being switched at a frequency determined according to a predetermined time constant, and then output from the secondary coil of the transforming element after being rectified, comprises comparing a voltage of the rectified output with a reference value (operation 400), branching the rectified output current when the output voltage is greater than the reference value and supplying the current to the dummy resistor 330 (operation 410), and reducing the amount of AC power supplied to the transforming element 310 by detecting the current flowing to the dummy resistor 330 and changing the predetermined time constant and reducing the switching frequency (operation 420).

If the voltage of the rectified output is less than the reference value as the load is again applied after the current is branched (operation 430) and supplied to the dummy resistor 330, the current branched and supplied to the dummy resistor 330 is blocked and the time constant used for the switching frequency reverts to the predetermined initial value (operation 440).

If the output voltage is less than the reference value in operation 400, the dummy resistor is not connected (operation 450) and the SMPS switches at the initial frequency (operation 460).

The switching method of the SMPS is the same as the operation of the SMPS illustrated in FIGS. 2 and 3, and thus will not be described herein.

Figure 5:
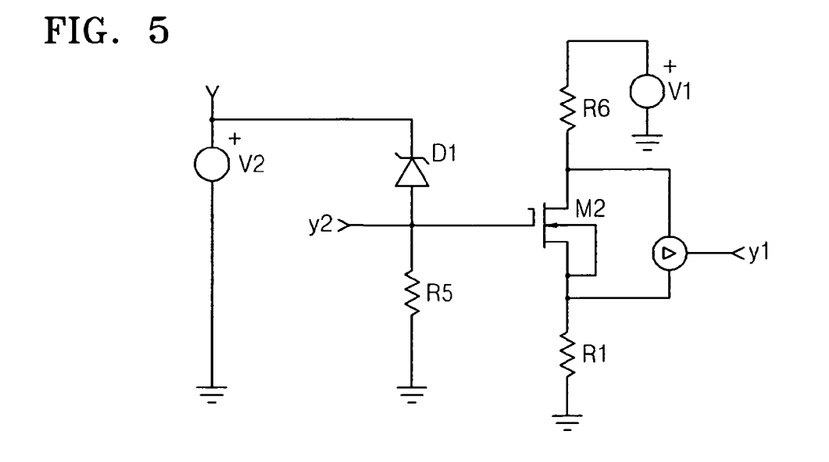
FIG. 5 is a circuit diagram of an SMPS according to another exemplary embodiment of the present invention in which an experiment is conducted.
Figure 6:
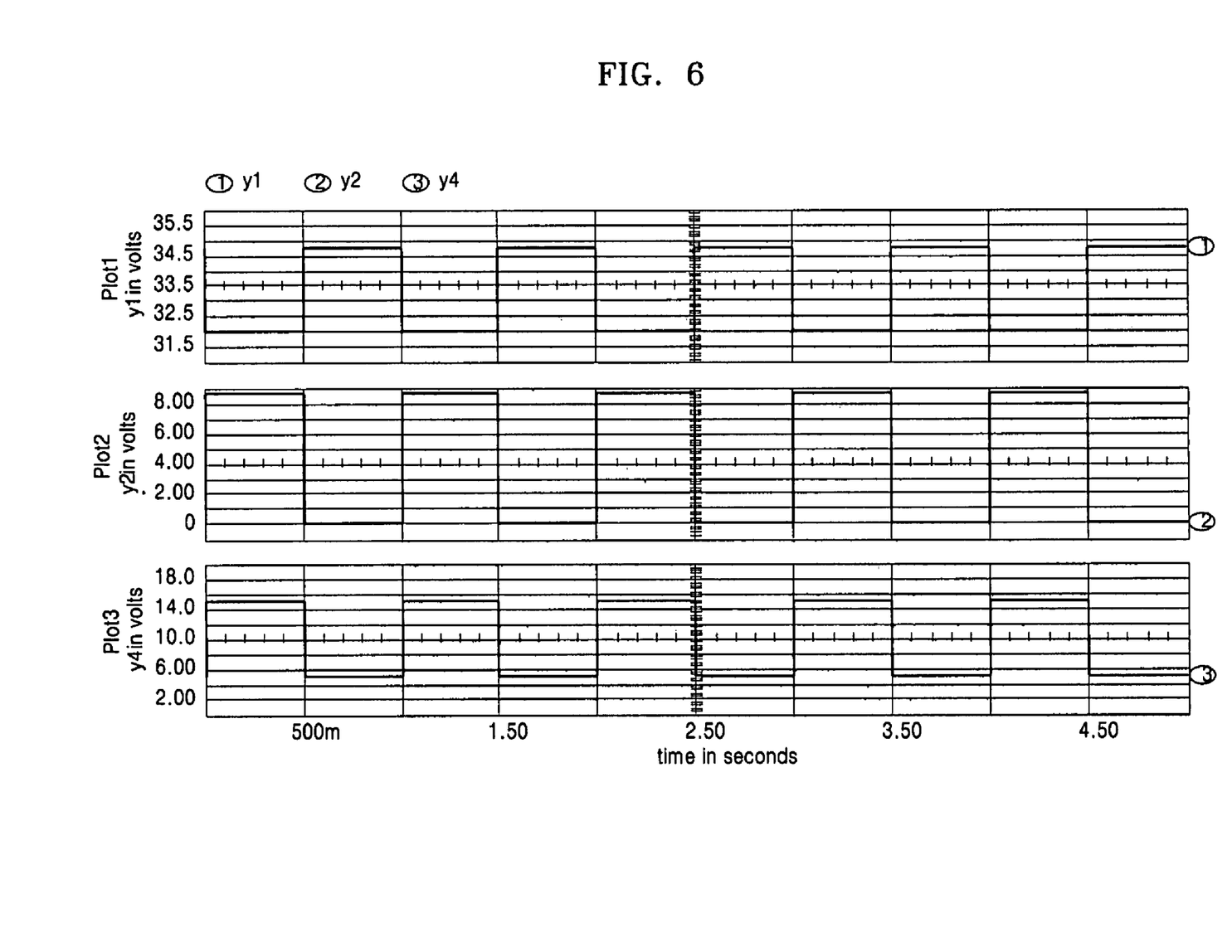
FIG. 6 is a graph illustrating results of the experiment using the circuit illustrated in FIG. 5.

FIG. 5 is a circuit diagram of an SMPS according to another exemplary embodiment of the present invention in which an experiment is conducted, and FIG. 6 is a graph illustrating the results of the experiment using the circuit illustrated in FIG. 5.

In FIG. 5, D1 illustrates the zener diode 321 (see FIG. 3), M2 illustrates the MOSFET 323 (see FIG. 3), y1 represents a voltage applied to dummy resistor 330 (see FIG. 3) and y2 represents a voltage output of zener diode D1. In FIG. 6, y4 represents a voltage output from the output terminal VOUT (see FIG. 3) of the SMPS. FIG. 6 illustrates voltages of y1, y2, and y4.

As can be seen from the experimental results in FIG. 6, if the voltage output from the output terminal is greater than a predetermined voltage, current starts to pass through the zener diode 321, and the MOSFET 323 is switched ON by the operation of the zener diode 321. As a result, the current is branched and flows to the dummy resistor, which controls the current.

According to an exemplary embodiment of the present invention, an SMPS with an active load detection function supplies input power to the primary coil of a transforming element, then to the secondary coil of the transforming element, and then rectifies and outputs the power. The SMPS comprises a switching unit which switches the AC power input to the primary coil of the transforming element at a frequency determined by a predetermined time constant and supplies the switched AC power to the secondary coil of the transforming element. The SMPS further comprises a branching unit which branches current output from the secondary coil and supplies the branched current to a dummy resistor when the rectified current or voltage output from the secondary coil is greater or smaller than a predetermined value The SMPS additionally comprises a detecting unit which detects the branched current flowing to the dummy resistor and a controlling unit which controls switching frequency by changing the time constant of the switching unit depending on the detected branched current of the detecting unit and reducing the amount of power supplied to the primary coil of the transforming element. In the SMPS, the current at a terminal of the dummy resistor can be controlled under a cross condition, the current flowing to the dummy resistor can be controlled when in a normal state, thus preventing the energy loss which always occurs in the dummy resistor, and the switching frequency during a standby state can be reduced to reduce switching loss. As a result, heating energy expended in a switching MOSFET used to switch the AC power can be reduced.

While the present invention has been particularly shown and described with reference to certain exemplary embodiments thereof, it will be understood by those of ordinary skill in the art that various changes in form and detail may be made therein without departing from the spirit and scope of the present invention as defined by the appended claims and equivalents thereof. The exemplary embodiments should be considered in a descriptive sense only and not for purposes of limitation. Therefore, the scope of the invention is defined not by the detailed description of exemplary embodiments but by the appended claims, and all differences within the scope will be construed as being included in the present invention. Also, it will be understood by those of ordinary skill in the art that the present invention can be embodied in various ways as software or hardware using a general programming method.

What is claimed is:

1. A switching mode power supply with an active load detection function, the switching mode power supply comprising:
    a switching unit which switches an AC power input to a primary coil of a transforming element at a frequency determined by a time constant and supplies the switched AC power to a secondary coil of the transforming element;
    a branching unit which branches current output from the secondary coil and supplies the branched current to a dummy resistor when the rectified current or voltage output from the secondary coil is greater or smaller than a reference value;
    a detecting unit which detects the branched current flowing to the dummy resistor; and
    a controlling unit which controls switching frequency by changing the time constant of the switching unit depending on the detected branched current of the detecting unit and reducing the amount of power supplied to the primary coil of the transforming element.

2. The switching mode power supply of claim 1, wherein the branching unit comprises a diode connected to the dummy resistor, and the branching unit supplies rectified current to the dummy resistor via the diode according to the change in voltage when the rectified current output from the secondary coil is changed.

3. The switching mode power supply of claim 1, wherein the detecting unit comprises a photocoupler light emitting unit connected to the dummy resistor, and the branched current supplied to the dummy resistor emits light from the photocoupler light emitting unit as current passes through a photocoupler, and detects the current flowing through the dummy resistor.

4. The switching mode power supply of claim 1, wherein the switching mode power supply is configured to supply AC power input to the primary coil of the transforming element, then to the secondary coil of the transforming element, and then rectify and output the power.

5. A switching mode power supply with an active load detection function, the switching mode power supply comprising:
- a switching unit which switches an AC power input to a primary coil of a transforming element at a frequency determined by a time constant and supplies the switched AC power to a secondary coil of the transforming element;
- a branching unit which branches current output from the secondary coil and supplies the branched current to a dummy resistor when the rectified voltage output from the secondary coil is greater than a reference value;
- a detecting unit which detects the branched current flowing to the dummy resistor; and
- a controlling unit which reduces switching frequency by changing the time constant of the switching unit depending on the detected branched current of the detecting unit and reducing the amount of power supplied to the primary coil of the transforming element.

6. The switching mode power supply of claim 5, wherein the branching unit stops branching the current flowing to the dummy when the rectified voltage output from the secondary coil is less than a reference value, and
- if the detecting unit cannot detect the current flowing to the dummy resistor, the controlling unit controls the switching unit to operate at a frequency according to the time constant.

7. The switching mode power supply of claim 5, wherein the branching unit comprises a diode device connected to the dummy resistor, and the branching unit is configured to supply the rectified current to the dummy resistor via the diode device if the rectified voltage is greater than a reference voltage.

8. The switching mode power supply of claim 5, wherein the detecting unit comprises a photocoupler light emitting unit connected to the dummy resistor, and the branched current supplied to the dummy resistor emits light from the photocoupler light emitting unit as the branched current passes through a photocoupler and detects the current flowing through the dummy resistor.

9. The switching mode power supply of claim 8, wherein the controlling unit comprises:
- a photocoupler light receiving unit; and
- a control capacitor connected to the photocoupler light receiving unit,
- wherein if the photocoupler light emitting unit emits light, the photocoupler light receiving unit is configured to detect the emitted light and supply current, the supplied current changes the time constant of the switching unit according to the capacitance of the control capacitor as the current passes through the control capacitor, and changes the switching frequency according to a changed frequency determined by the changed time constant.

10. The switching mode power supply of claim 5, wherein the switching mode power supply is configured to supply AC power input to the primary coil of the transforming element, then to the secondary coil of the transforming element, and then rectify and output the power.

11. A method of switching a switching mode power supply, the method comprising:
- comparing a rectified output voltage from a secondary coil of a transforming element with a reference value;
- branching a rectified output current when the rectified output voltage is greater than the reference value; and
- detecting the branched current flowing to a dummy resistor and changing a time constant to reduce the switching frequency so that the AC power supplied to the transforming element is reduced.

12. The switching method of claim 11, further comprising, after the branching of the rectified output current, blocking the branched current supplied to the dummy resistor and maintaining a time constant used to determined the switching frequency as the time constant if the rectified output voltage after branching and supplying the current to the dummy resistor is less than the reference value.

13. The switching method of claim 11, wherein the switching mode power supply is configured for supplying AC power to the transforming element after switching the power according to a frequency determined by the time constant, and rectifying and outputting power output from a secondary coil of the transforming element.

* * * * *